(12) United States Patent
Wu (10) Patent No.: US 12,008,173 B2
(45) Date of Patent: Jun. 11, 2024

(54) MULTI-SENSOR HANDLE CONTROLLER HYBRID TRACKING METHOD AND DEVICE

(71) Applicant: QINGDAO PICO TECHNOLOGY CO., LTD., Shandong (CN)

(72) Inventor: Tao Wu, Shandong (CN)

(73) Assignee: QINGDAO PICO TECHNOLOGY CO., LTD., Qingdao (CN)

(*) Notice: Subject to any disclaimer, the term of this patent is extended or adjusted under 35 U.S.C. 154(b) by 0 days.

(21) Appl. No.: 18/086,425

(22) Filed: Dec. 21, 2022

(65) Prior Publication Data
US 2023/0119687 A1    Apr. 20, 2023

Related U.S. Application Data

(63) Continuation of application No. PCT/CN2021/103544, filed on Jun. 30, 2021.

(30) Foreign Application Priority Data

Jul. 1, 2020 (CN) .......................... 202010625647.9

(51) Int. Cl.
*G06F 3/0346* (2013.01)
*G02B 27/01* (2006.01)
(Continued)

(52) U.S. Cl.
CPC ....... *G06F 3/0346* (2013.01); *G02B 27/0101* (2013.01); *G02B 27/0172* (2013.01);
(Continued)

(58) Field of Classification Search
None
See application file for complete search history.

(56) References Cited

U.S. PATENT DOCUMENTS

| 2016/0305784 A1 | 10/2016 | Roumeliotis et al. |
| 2019/0041979 A1 | 2/2019 | Kirchner et al. |

(Continued)

FOREIGN PATENT DOCUMENTS

| CN | 101813780 A | 8/2010 |
| CN | 104764451 A | 7/2015 |

(Continued)

OTHER PUBLICATIONS

International Patent Application No. PCT/CN2021/103544; Int'l Search Report; dated Oct. 12, 2021; 2 pages.
(Continued)

*Primary Examiner* — Ifedayo B Iluyomade
(74) *Attorney, Agent, or Firm* — BakerHostetler (57) ABSTRACT

The present disclosure discloses a multi-sensor handle controller hybrid tracking method and device, wherein the method includes: acquiring tracking data of a handle controller, the tracking data including optical tracking data, electromagnetic tracking data, and inertial navigation data; constructing a state transition model and an observation model of an extended Kalman filtering iteration strategy according to the tracking data, and performing an extended Kalman filtering fusion on the optical tracking data, the electromagnetic tracking data, and the inertial navigation data; and determining position and orientation information of the handle controller in a space according to the extended Kalman filtering iteration strategy.

9 Claims, 3 Drawing Sheets

S21 — Acquiring 6DoF data and velocity information of an optical pattern mark point on the handle controller relative to a first camera on a head mounted display in real time according to the optical tracking data S22 — Converting 6DoF data with respect to other cameras into 6DoF data under a coordinate system with the first camera as an origin, by using calibration parameters among the cameras, which is denoted as $Pose_{go}$ S23 — Converting electromagnetic 6DoF data of the handle controller into 6DoF data under the coordinate system with the first camera as the origin, through calibration parameter of an electromagnetic signal receiver internally provided in the head mounted display and the first camera, which is denoted as $Pose_{EM}$ S24 — Fusing the data $Pose_{go}$ and the data $Pose_{EM}$ into new pose data, which is denoted as $Pose_{OEM}$ S25 — Constructing the state transition model and the observation model of the extended Kalman filtering iteration strategy by using the new pose data (51) Int. Cl.
  *G06F 3/01* (2006.01)
  *G06T 7/277* (2017.01)
  *G06T 7/73* (2017.01)
(52) U.S. Cl.
  CPC .............. *G06F 3/011* (2013.01); *G06T 7/277* (2017.01); *G06T 7/73* (2017.01); *G02B 2027/0138* (2013.01); *G02B 2027/014* (2013.01); *G06T 2207/20024* (2013.01); *G06T 2207/20221* (2013.01)

(56) References Cited

U.S. PATENT DOCUMENTS

| | | | |
|---|---|---|---|
| 2019/0243472 A1 | 8/2019 | Stafford et al. | |
| 2020/0027275 A1* | 1/2020 | Wan | G06V 10/82 |

FOREIGN PATENT DOCUMENTS

| | | | | |
|---|---|---|---|---|
| CN | 104764452 A | | 7/2015 | |
| CN | 106500695 A | | 3/2017 | |
| CN | 108759826 A | | 11/2018 | |
| CN | 109376785 | * | 2/2019 | ............. G06T 7/277 |
| CN | 109376785 A | | 2/2019 | |
| CN | 110081881 A | | 8/2019 | |
| CN | 110503667 A | | 11/2019 | |
| CN | 110530356 A | | 12/2019 | |
| CN | 110782492 A | | 2/2020 | |
| CN | 110956653 A | | 4/2020 | |
| CN | 111174683 A | | 5/2020 | |
| CN | 111949123 A | | 11/2020 | |
| WO | WO 2020/087846 A1 | | 5/2020 | |

OTHER PUBLICATIONS

Peng et al.; "Fusion Sensing Data of Mobile Phone and UAV for Motion Tracking"; Computer Measurement & Control; vol. 8; Aug. 2018; p. 299-303 (contains English Abstract).

Luo et al.; "Research on robot pose estimation based on multi-sensor fusion"; Experimental Technology and Management; vol. 37 No. 5; May 2020; p. 58-2 (contains English Abstract).

Luo et al.; "Multi-Sensor Data Fusion for Optical Tracking of Head Pose"; Acta Automatica Sinica; vol. 36 No. 9; Sep. 2010; p. 1239-1249 (contains English Abstract).

Wang et al.; "An Overview of Data Fusion Algorithm for Attitude Detection Systems"; Electronic Science & Technology; Oct. 2018; p. 39-43 (contains English Abstract).

* cited by examiner

MULTI-SENSOR HANDLE CONTROLLER HYBRID TRACKING METHOD AND DEVICE

CROSS REFERENCE TO RELATED APPLICATIONS

The present application is a continuation of International application No. PCT/CN2021/103544 filed on Jun. 30, 2021, which claims priority to Chinese Patent Application No. 202010625647.9, filed on Jul. 1, 2020 and entitled "MULTI-SENSOR HANDLE CONTROLLER HYBRID TRACKING METHOD AND DEVICE", which is incorporated in its entirety herein by reference.

TECHNICAL FIELD

The present disclosure relates to the technical field of computer vision, and in particular, to a multi-sensor handle controller hybrid tracking method and device.

BACKGROUND

At present, in the VR/AR/MR field, in most cases, a camera device is used to capture, through some mark points of a special optical pattern that is provided on a handle controller, a motion state of the optical pattern on the handle controller in a space in real time, and in combination with an IMU (Inertial Measurement Unit) inertial navigation sensor internally provided in the handle controller, 6DoF (degree of freedom) of position and orientation information of the handle controller in the space is tracked through computer vision technology; also in some cases, by using an ultrasonic sensor and an IMU inertial navigation sensor that are internally provided in the handle controller, in combination with ultrasonic data and IMU inertial navigation data corresponding to motion of a handle in the space, 6DoF of position and orientation information of the handle controller in the space is tracked in real time; and still in some cases, by using an electromagnetic sensor and an IMU inertial navigation sensor that are internally provided in the handle controller, in combination with electromagnetic data and IMU inertial navigation data corresponding to motion of a handle in the space, 6DoF of position and orientation information of the handle controller in the space is tracked in real time.

However, when tracking control is performed on the pose information of the handle controller by using the existing handle controller pose tracking method, the following several factors likely occur to greatly influence tracking performance of the handle controller. For example, since a camera is sensitive to ambient light, complexity of the ambient light will directly influence imaging quality of the camera, and further influence the tracking performance of the handle controller; in an actual environment, position information of a plurality of mark points of an optical pattern on the handle controller and the camera easily keep at same incident angle, or when the handle controller is close to the camera, information of object blocks of the optical pattern mark points on the handle controller on an image imaged by the tracking camera will overlap or adhere, thereby influencing the tracking performance of the handle controller; the electromagnetic sensor on the handle controller is sensitive to an electromagnetic signal in the environment and is vulnerable to interference of complex electromagnetic signals in the environment, so that the electromagnetic sensor will generate wrong electromagnetic tracking data of the handle controller, for example, when the electromagnetic sensor of the handle controller is close to a computer host, or is in an environment close to an audio/microphone, a television set, a refrigerator and the like, the tracking performance of the handle controller will be also influenced. Therefore, the existing handle controller pose tracking method will be influenced by different interference sources in a normal environment, and has much limitations, as a result, the handle controller will have phenomena such as drifting, jittering, jamming and the like in a virtual scene, which seriously affects user experience.

SUMMARY

In view of the above problems, an objective of the present disclosure is to provide a multi-sensor handle controller hybrid tracking method and device, so as to solve the problems that the existing handle controller tracking method is vulnerable to different interference sources, has use limitations in the virtual scene, and affects user experience.

In order to achieve the objective, the present disclosure adopts the following technical solutions:

In one aspect of the present disclosure, there is provided a multi-sensor handle controller hybrid tracking method, comprising:

acquiring tracking data of a handle controller, the tracking data comprising optical tracking data, electromagnetic tracking data, and inertial navigation data;

constructing a state transition model and an observation model of an extended Kalman filtering iteration strategy according to the tracking data, and performing an extended Kalman filtering fusion on the optical tracking data, the electromagnetic tracking data, and the inertial navigation data; and determining position and orientation information of the handle controller in a space according to the extended Kalman filtering iteration strategy.

In another aspect of the present disclosure, there is provided a multi-sensor handle controller hybrid tracking device, wherein a surface of a handle controller is provided with an optical pattern mark point, the device comprising:

a plurality of cameras provided on a head mounted display and configured to track and shoot the optical pattern mark point;

an optical sensor configured to acquire optical tracking data of the optical pattern mark point;

an electromagnetic sensor configured to acquire electromagnetic tracking data of the handle controller;

an inertial navigation sensor configured to acquire inertial navigation data of the handle controller;

the head mounted display internally provided with a wireless transmission module and configured to receive the optical tracking data, the electromagnetic tracking data, and the inertial navigation data;

a model construction module configured to construct a state transition model and an observation model of an extended Kalman filtering iteration strategy and perform an extended Kalman filtering fusion on the optical tracking data, the electromagnetic tracking data, and the inertial navigation data; and a tracking module configured to determine position and orientation information of the handle controller in a space according to the extended Kalman filtering iteration strategy.

Compared with the prior art, the present disclosure has the following advantages and beneficial effects:

In the present disclosure, the tracking data of the handle controller is acquired based on an optical sensor, an electromagnetic sensor, and an inertial navigation sensor, hybrid tracking is performed on the handle controller, which takes into consideration influences of different interference sources on the tracking performance of the handle controller, so that the use limitations of the tracking method are improved.

In the present disclosure, the state transition model and the observation model of the extended Kalman filtering are constructed by using three-way sensor data of the handle controller, so that stability of the application of the handle controller in the virtual scene is optimized, and meanwhile, high-precision tracking quality of the handle controller can be maintained.

DETAILED DESCRIPTION

Embodiments according to the present disclosure will be described below with reference to the accompanying drawings. One of ordinary skill in the art will recognize that the described embodiments can be modified in various different ways, or combinations thereof, without departing from the spirit and scope of the present disclosure. Accordingly, the drawings and description are illustrative in essence, and are not used for limiting the protection scope of the claims. Furthermore, in this description, the drawings are not drawn to scale, and identical reference numerals represent identical parts.

Figure 1:
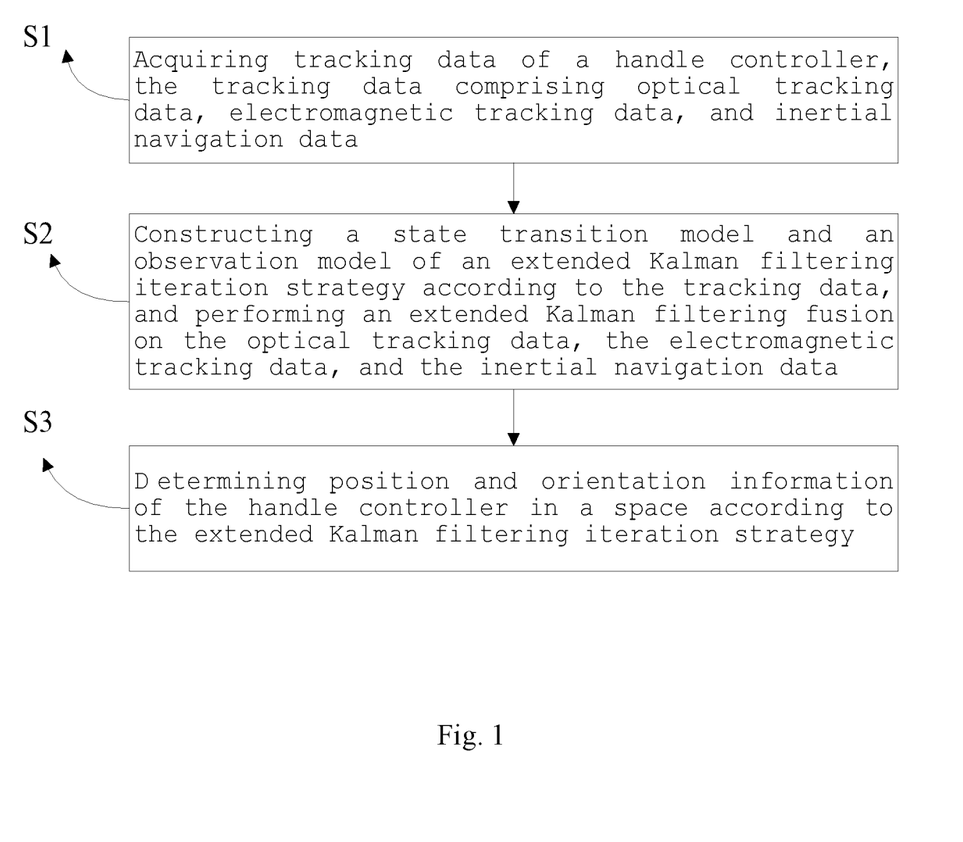
FIG. 1 is a schematic flow diagram of a multi-sensor handle controller hybrid tracking method according to the present disclosure.

A handle controller is, in a VR/AR/MR field, an indispensable interactive device, and also a necessary device for a user to interact with a virtual reality scene, an augmented reality scene, or a mixed reality scene, and is used in conjunction with a VR head-mounted all-in-one machine, so that key performance parameters such as tracking precision, tracking delay, and tracking stability of the handle controller directly affect user experience. The multi-sensor-based hybrid tracking method of the present disclosure can track position and orientation information of the handle controller in a three-dimensional space. FIG. 1 is a schematic flow diagram of the multi-sensor handle controller hybrid tracking method according to the present disclosure, and as shown in FIG. 1, the multi-sensor handle controller hybrid tracking method according to the present disclosure comprises:

step S1, acquiring tracking data of a handle controller, the tracking data comprising optical tracking data, electromagnetic tracking data, and inertial navigation data, wherein the optical tracking data is acquired through measurement by an optical sensor, the electromagnetic tracking data is acquired through measurement by an electromagnetic sensor, and the inertial navigation data is acquired through measurement by a gravitational acceleration sensor and a gyroscope sensor, and is used for measuring movement and rotation in three directions of x axis, y axis and z axis, for example, by using an inertial measurement unit (IMU); the IMU comprises an accelerometer for measuring movement along the x, y, z axes, a gyroscope for measuring rotation motion of 360°, and a magnetometer for measuring magnetic field intensity and orientation, and positioning a device;

step S2, constructing a state transition model and an observation model of an extended Kalman filtering iteration strategy according to the tracking data, and performing an extended Kalman filtering fusion on the optical tracking data, the electromagnetic tracking data, and the inertial navigation data; and step S3, determining position and orientation information of the handle controller in a space according to the extended Kalman filtering iteration strategy, wherein the orientation information refers to an orientation of the handle controller.

When the state transition model and the observation model of the extended Kalman filtering iteration strategy are constructed, by taking into consideration the optical tracking data, the electromagnetic tracking data, and the inertial navigation data of the handle controller, the influence of different interference factors can be reduced, and tracking stability of the handle controller is enhanced, such that the handle controller is suitable for various different environments. In particular, in a virtual environment application, user experience can be enhanced.

The implementation of the multi-sensor-based handle controller hybrid tracking method according to the present disclosure can be roughly divided into two stages, which are an acquisition stage of the tracking data and a construction stage of the extended Kalman filtering iteration strategy, respectively.

In an embodiment, the step of acquiring the optical tracking data of the handle controller comprises:

capturing motion of the handle controller in the space in real time, and obtaining a handle image comprising an optical pattern mark point provided on the handle controller; for example, it can be realized by a plurality of cameras provided on a surface of a head mounted display, and through the plurality of cameras the motion of the handle controller is captured and shot;

performing feature detection on the handle image, and acquiring a position coordinate of the optical pattern mark point on the handle controller on the handle image; and solving, by a PNP (perspective-n-point) algorithm, position and orientation data of the optical pattern mark point relative to the camera, as the optical tracking data of the handle controller.

The electromagnetic sensor comprises an electromagnetic signal generator and an electromagnetic signal receiver, wherein the electromagnetic signal generator is internally provided in the handle controller, the electromagnetic signal receiver is internally provided in the head mounted display, and the motion of the handle controller is tracked through the electromagnetic sensor. In an embodiment, the step of acquiring the electromagnetic tracking data of the handle controller comprises:

emitting an electromagnetic signal by using the electromagnetic signal generator internally provided in the handle controller;

receiving the electromagnetic signal through the electromagnetic signal receiver internally provided in the head mounted display; and acquiring, through an electromagnetic positioning six-degree-of-freedom solution model, position and orientation data of the electromagnetic signal generator relative to the electromagnetic signal receiver, as the electromagnetic tracking data of the handle controller.

In an embodiment, the IMU inertial navigation data of the handle controller is received through a wireless transmission module internally provided in the head mounted display, wherein the IMU inertial navigation data comprises three-axis (the x axis, y axis, and z axis) data measured by the gravitational acceleration sensor and three-axis (the x axis, y axis, and z axis) data measured by the gyroscope sensor.

Preferably, four cameras are provided on the head mounted display for capturing the motion of the handle controller.

Figure 2:
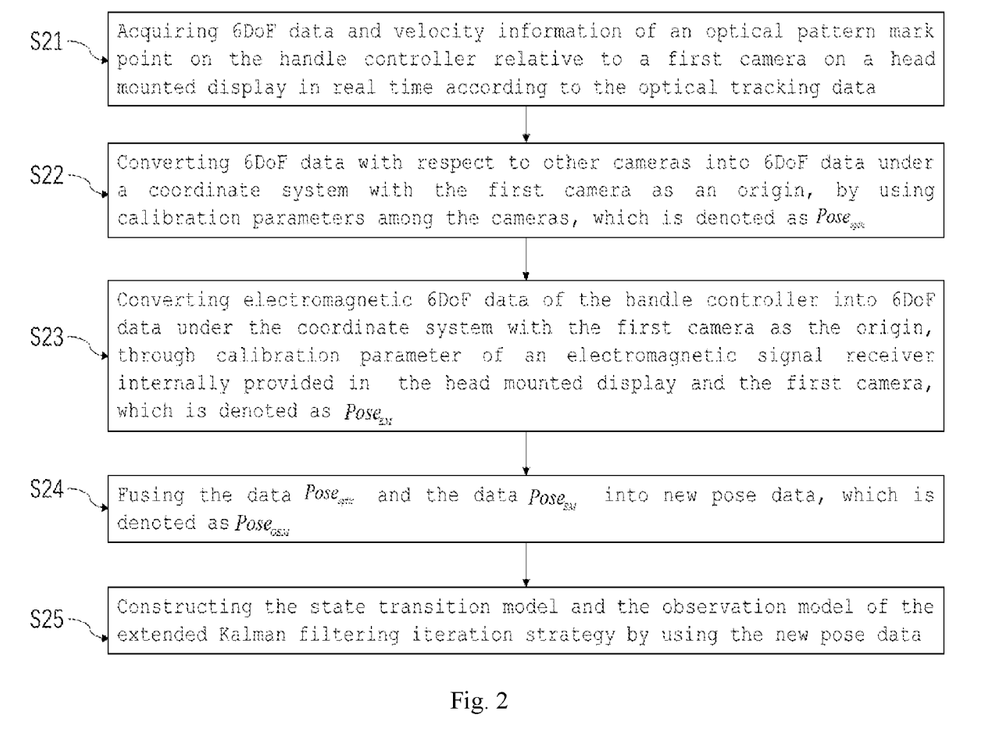
FIG. 2 is a schematic flow diagram illustrating constructing a state transition model and an observation model of an extended Kalman filtering iteration strategy according to the present disclosure.

FIG. 2 is a schematic flow diagram illustrating constructing the state transition model and the observation model of the extended Kalman filtering iteration strategy according to the present disclosure, and as shown in FIG. 2, in an embodiment, the step of constructing the state transition model and the observation model of the extended Kalman filtering iteration strategy according to the tracking data comprises:

step S21, acquiring 6DoF data and velocity information of the optical pattern mark point on the handle controller relative to a first camera on the head mounted display in real time according to the optical tracking data, the velocity information being denoted as $V_x$, $V_y$, $V_z$;

step S22, converting 6DoF data with respect to a second camera, a third camera, and a fourth camera into 6DoF data under a coordinate system with the first camera as an origin by using calibration parameters among the cameras, and the 6DoF optical data under the coordinate system with the first camera as the origin being denoted as $Pose_{optic}$, which comprises angle and translation information in the x-axis direction, angle and translation information in the y-axis direction, and angle and translation information in the z-axis direction;

step S23, converting electromagnetic 6DoF data of the handle controller into 6DoF data under the coordinate system with the first camera as the origin, through calibration parameter of the electromagnetic signal receiver internally provided in the head mounted display and the first camera, the 6DoF data under the coordinate system with the first camera as the origin being denoted as $Pose_{EM}$, which comprises angle and translation information in the x-axis direction, angle and translation information in the y-axis direction, and angle and translation information in the z-axis direction;

step S24, fusing the optical data $Pose_{optic}$ and the electromagnetic data $Pose_{EM}$ into new pose data, which is denoted as $Pose_{EM}$; and step S25, constructing the state transition model and the observation model of the extended Kalman filtering iteration strategy by using the new pose data $Pose_{OEM}$.

Further, the step of fusing the optical data $Pose_{optic}$ and the electromagnetic data $Pose_{EM}$ into the new pose data, which is denoted as $Pose_{OEM}$, comprises:

respectively determining whether an angle difference between the data $Pose_{optic}$ and the data $Pose_{EM}$ on the x axis, the y axis, and the z axis is less than a first set threshold, and whether a displacement difference therebetween is less than a second set threshold; wherein comparison is respectively performed on angles and displacements in the x-axis direction, the y-axis direction, and the z-axis direction, for example, an angle difference between the data $Pose_{optic}$ and the data $Pose_{EM}$ in the x-axis direction, an angle difference between the data $Pose_{optic}$ and the data $Pose_{EM}$ in the y-axis direction, and an angle difference between the data $Pose_{optic}$ and the data $Pose_{EM}$ in the z-axis direction, and according to this, comparison on displacement information is performed to obtain displacement differences in the three axis directions; wherein the first set threshold can be set to about 3°, and the second set threshold can be set to about 20 mm;

if the angle difference is less than the first set threshold and the displacement difference is less than the second set threshold, respectively taking an average of the data $Pose_{optic}$ and the data $Pose_{EM}$ in the x-axis direction, the y-axis direction, and the z-axis direction as the data $Pose_{OEM}$; for example, taking an average of the angles of the data $Pose_{optic}$ and the data $Pose_{EM}$ in the x-axis direction as an angle of the data $Pose_{OEM}$ in the x-axis direction; and if the angle difference is not less than the first set threshold and/or the displacement difference is not less than the second set threshold, respectively performing weighted average on the data $Pose_{optic}$ and the data the data $Pose_{EM}$ in the x-axis direction, the y-axis direction, and the z-axis direction to obtain the data $Pose_{OEM}$, wherein weights of the optical data and the electromagnetic data can be determined according to a practical application environment of the handle controller, and preferably, the weight of the optical data $Pose_{optic}$ is set to be 0.65, and the weight of the electromagnetic data $Pose_{EM}$ is set to be 0.35.

Preferably, the state transition model of the extended Kalman filtering iteration strategy is as follows:

$$\begin{vmatrix} p_x^k \\ v_x^k \\ p_y^k \\ v_y^k \\ p_z^k \\ v_z^k \end{vmatrix} = \begin{bmatrix} 1 & \Delta T & 0 & 0 & 0 & 0 \\ 0 & 1 & 0 & 0 & 0 & 0 \\ 0 & 0 & 1 & \Delta T & 0 & 0 \\ 0 & 0 & 0 & 1 & 0 & 0 \\ 0 & 0 & 0 & 0 & 1 & \Delta T \\ 0 & 0 & 0 & 0 & 0 & 1 \end{bmatrix} *$$

$$\begin{vmatrix} p_x^{k-1} \\ v_x^{k-1} \\ p_y^{k-1} \\ v_y^{k-1} \\ p_z^{k-1} \\ v_z^{k-1} \end{vmatrix} + \begin{bmatrix} 0.5*\Delta T^2 & 0 & 0 \\ \Delta T & 0 & 0 \\ 0 & 0.5*\Delta T^2 & 0 \\ 0 & \Delta T & 0 \\ 0 & 0 & 0.5*\Delta T^2 \\ 0 & 0 & \Delta T \end{bmatrix} * \begin{vmatrix} Acc_x^k \\ Acc_y^k \\ Acc_z^k \end{vmatrix}$$

where $p_x^k$ and $p_x^{k-1}$ are respectively displacement components in the x-axis direction after optimization iteration at a kth timing and a (k−1)th timing, $p_y^k$ and $p_y^{k-1}$ are respectively displacement components in the y-axis direction after the optimization iteration at the kth timing and the (k−1)th timing, and $p_z^k$ and $p_z^{k-1}$ are respectively displacement components in the z-axis direction after the optimization iteration at the kth timing and the (k−1)th timing; displacement components in the directions of the three axes x, y, and z at an initial timing are equal to $Pose_{OEM}$;

$v_x^k$ and $v_x^{k-1}$ are respectively velocity displacement components in the x-axis direction in the optical tracking data at the kth timing and at the (k−1)th timing, and $v_y^k$ and $v_y^{k-1}$ are respectively velocity displacement components in the y-axis direction in the optical tracking data at the kth timing and at the (k−1)th timing, and $v_z^k$ and $v_z^{k-1}$ are respectively velocity displacement components in the z-axis direction in the optical tracking data at the kth timing and at the (k−1)th timing; values of velocity displacement components in the directions of the three axes x, y, and z at the initial timing are all 0;

$Acc_x^k$, $Acc_y^k$, and $Acc_z^k$ respectively denote motion data of the gravitational acceleration sensor in the x axis, the y axis and the z axis after a gravity direction is removed at the kth timing; and ΔT denotes a time difference between the kth timing and the (k−1)th timing.

Further, optionally, a refresh rate of the tracking data of $Pose_{OEM}$ is 200 Hz, i.e. the time difference ΔT between the kth timing and the (k−1)th timing is 5 ms.

Further, the observation model of the extended Kalman filtering iteration strategy is as follows:

$$\begin{vmatrix} Zp_x^k \\ Zp_y^k \\ Zp_z^k \end{vmatrix} = \begin{bmatrix} 1 & 0 & 0 \\ 0 & 1 & 0 \\ 0 & 0 & 1 \end{bmatrix} * \begin{vmatrix} Pose_x^k \\ Pose_y^k \\ Pose_z^k \end{vmatrix}$$

where $Zp_x^k$, $Zp_y^k$, and $Zp_z^k$ are respectively position data in the x direction, the y direction, and the z direction that are generated by optimization according to the extended Kalman filtering iteration;

k denotes a timing; and $Pose_x^k$, $Pose_y^k$, and $Pose_z^k$ are respectively position movement data in the directions of the three axes x, y, and z at the timing k in the fused data $Pose_{OEM}$.

In an embodiment of the present disclosure, the method further comprises: setting a process noise covariance matrix as follows:

$$PNoiseCov = \begin{bmatrix} p\_error & 0 & 0 & 0 & 0 & 0 \\ 0 & v\_error & 0 & 0 & 0 & 0 \\ 0 & 0 & p\_error & 0 & 0 & 0 \\ 0 & 0 & 0 & v\_error & 0 & 0 \\ 0 & 0 & 0 & 0 & p\_error & 0 \\ 0 & 0 & 0 & 0 & 0 & v\_error \end{bmatrix}$$

where PNoiseCov denotes the process noise covariance matrix, p_error denotes a displacement noise error, and v_error denotes a velocity noise error.

The process noise covariance matrix is set as a diagonal matrix, and according to a system noise attribute, it is set that displacement noise errors of the handle controller in the three directions of the x axis, the y axis, and the z axis are equal, and velocity noise errors in the three directions of the x axis, the y axis, and the z axis are equal; and the less the handle motion velocity, the greater the process noise of the position translation and the velocity in the directions of the three axes x, y, and z, and the greater the handle motion velocity, the less the process noise of the position translation and the velocity in the directions of the three axes x, y and z. Preferably, the displacement noise error and the velocity noise error in the process noise are adaptively adjusted through the following model:

$p\_error=(1-x)^4*10, x \in [0.01, 0.1]$ $v\_error=(1-x)^5*10, x \in [0.01, 0.1]$ where x denotes a degree of confidence for smoothing of the position movement data in the directions of the three axes x, y and z at the kth timing in the data $Pose_{OEM}$ of the handle controller at a current-timing frame. x is inversely proportional to the motion velocity of the handle controller.

In an embodiment, the method further comprises: setting a measurement noise covariance matrix as follows:

$$MNoiseCov = \begin{bmatrix} M\_error & 0 & 0 \\ 0 & M\_error & 0 \\ 0 & 0 & M\_error \end{bmatrix}$$

where MNoiseCov denotes the measurement noise covariance matrix, and M_error denotes a measurement noise error.

In the present disclosure, the measurement noise covariance matrix is also set as a diagonal matrix, and values in the directions of the three axes x, y, and z can be considered to be equal. According to an overall noise evaluation of the multi-sensor handle controller hybrid tracking device of the present disclosure, it can be assumed that M_error=2, and of course, M_error can also be another value.

After the state transition model and the observation model are constructed, and the process noise covariance matrix and the measurement noise covariance matrix of the model are set, each frame of the tracking of the handle controller can optimize the position data of the 6DoF according to the extended Kalman filtering iteration strategy. Final tracking data 6DoF of the handle controller is the position data $Zp_x^k$, $Zp_y^k$, $Zp_z^k$ that are generated by optimization according to the extended Kalman filtering iteration, position smoothing data in the directions of the three axes x, y, and z, and orientation data in $Pose_{OEM}$.

It should be noted that the extended Kalman filtering iteration mentioned in the present disclosure is a commonly used motion estimation algorithm, which is not described in detail in the present disclosure.

The multi-sensor handle controller hybrid tracking method of the present disclosure can be applied to a virtual scene, to track motion of a handle controller.

The multi-sensor handle controller hybrid tracking method of the present disclosure can be applied to a multi-sensor handle controller hybrid tracking device. A surface of the handle controller is provided with an optical pattern mark point, and optical tracking data is acquired by using the optical pattern mark point, wherein the device comprises:

a plurality of cameras provided on a head mounted display and configured to track and shoot the optical pattern mark point, wherein for example, the cameras can be set to four, provided in a rectangular distribution and are respectively provided at four corners of the head mounted display; the optical pattern mark point can be a ring pattern or another marking pattern provided on the handle controller, which is not specifically limited in the present disclosure;

an optical sensor configured to acquire optical tracking data of the optical pattern mark point;

an electromagnetic sensor configured to acquire electromagnetic tracking data of the handle controller;

an inertial navigation sensor configured to acquire inertial navigation data of the handle controller;

the head mounted display internally provided with a wireless transmission module and configured to receive the optical tracking data, the electromagnetic tracking data, and the inertial navigation data;

a model construction module configured to construct a state transition model and an observation model of an extended Kalman filtering iteration strategy and perform an extended Kalman filtering fusion on the optical tracking data, the electromagnetic tracking data, and the inertial navigation data; and a tracking module configured to determine position and orientation information of the handle controller in a space according to the extended Kalman filtering iteration strategy.

Figure 3:
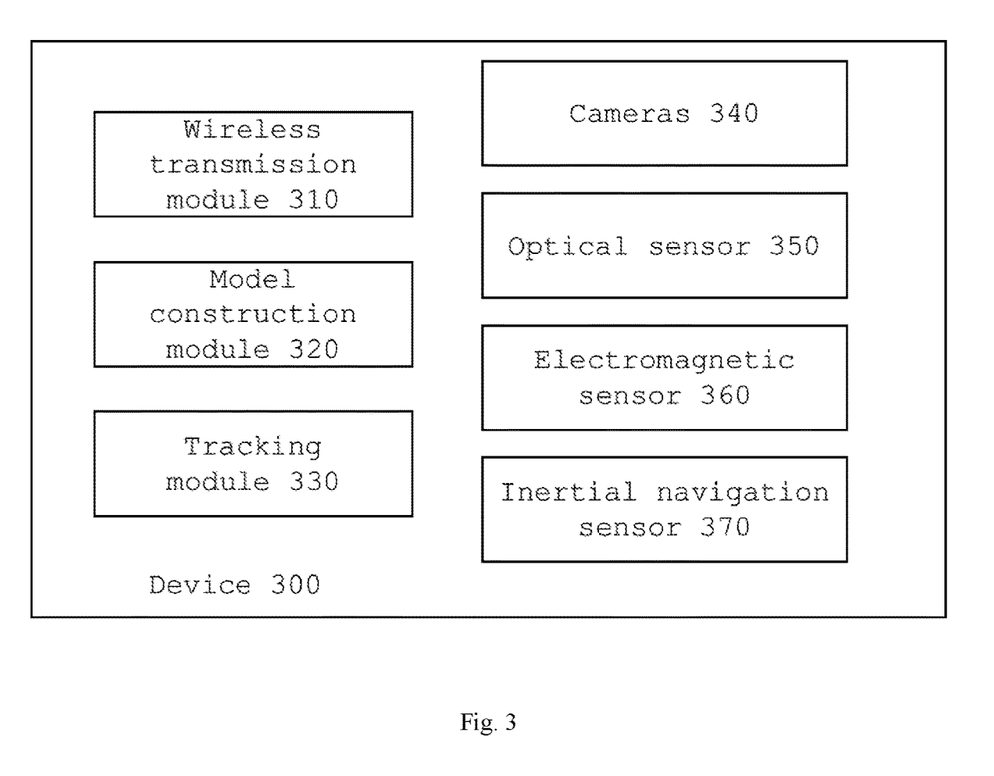
FIG. 3 is a schematic configuration diagram of a multi-sensor handle controller hybrid tracking device according to the present disclosure.

FIG. 3 is a schematic configuration diagram of the multi-sensor handle controller hybrid tracking device according to the present disclosure, and as shown in FIG. 3, in some embodiments of the present disclosure, the device 300 can include a wireless transmission module 310, a model construction module 320, and a tracking module 330. In some embodiments, the wireless transmission module 310 can be provided in a head mounted display. In addition, the device 300 can include a plurality of cameras 340, an optical sensor 350, an electromagnetic sensor 360, and an inertial navigation sensor 370. However, these skilled in the art can easily understand that it is not necessary for an embodiment of the disclosure to include all the above components, as long as the embodiment can implement the disclosure.

In an embodiment, the state transition model of the extended Kalman filtering iteration strategy constructed by the model construction module is:

$$\begin{vmatrix} p_x^k \\ v_x^k \\ p_y^k \\ v_y^k \\ p_z^k \\ v_z^k \end{vmatrix} = \begin{bmatrix} 1 & \Delta T & 0 & 0 & 0 & 0 \\ 0 & 1 & 0 & 0 & 0 & 0 \\ 0 & 0 & 1 & \Delta T & 0 & 0 \\ 0 & 0 & 0 & 1 & 0 & 0 \\ 0 & 0 & 0 & 0 & 1 & \Delta T \\ 0 & 0 & 0 & 0 & 0 & 1 \end{bmatrix} *$$

$$\begin{vmatrix} p_x^{k-1} \\ v_x^{k-1} \\ p_y^{k-1} \\ v_y^{k-1} \\ p_z^{k-1} \\ v_z^{k-1} \end{vmatrix} + \begin{bmatrix} 0.5*\Delta T^2 & 0 & 0 \\ \Delta T & 0 & 0 \\ 0 & 0.5*\Delta T^2 & 0 \\ 0 & \Delta T & 0 \\ 0 & 0 & 0.5*\Delta T^2 \\ 0 & 0 & \Delta T \end{bmatrix} * \begin{vmatrix} Acc_x^k \\ Acc_y^k \\ Acc_z^k \end{vmatrix}$$

where and $p_x^k$ and $p_x^{k-1}$ are respectively displacement components in the x-axis direction after optimization iteration at a kth timing and a (k−1)th timing, $p_y^k$ and $p_y^{k-1}$ are respectively displacement components in the y-axis direction after the optimization iteration at the kth timing and the (k−1)th timing, and $p_z^k$ and $p_z^{k-1}$ are respectively displacement components in the z-axis direction after the optimization iteration at the kth timing and the (k−1)th timing; displacement components in the directions of the three axes x, y, and z at an initial timing are equal to $Pose_{OEM}$;

$v_x^k$ and $v_x^{k-1}$ are respectively velocity displacement components in the x-axis direction in the optical tracking data at the kth timing and at the (k−1)th timing, and $v_y^k$ and $v_y^{k-1}$ are respectively velocity displacement components in the y-axis direction in the optical tracking data at the kth timing and at the (k−1)th timing, and $v_z^k$ and $v_z^{k-1}$ are respectively velocity displacement components in the z-axis direction in the optical tracking data at the kth timing and at the (k−1)th timing; values of velocity displacement components in the directions of the three axes x, y, and z at the initial timing are all 0;

$Acc_x^k$, $Acc_y^k$, and $Acc_z^k$ respectively denote motion data of a gravitational acceleration sensor in the x axis, the y axis and the z axis after a gravity direction is removed at the kth timing; and $\Delta T$ denotes a time difference between the kth timing and the (k−1)th timing.

Further, the observation model of the extended Kalman filtering iteration strategy is as follows:

$$\begin{vmatrix} Zp_x^k \\ Zp_y^k \\ Zp_z^k \end{vmatrix} = \begin{bmatrix} 1 & 0 & 0 \\ 0 & 1 & 0 \\ 0 & 0 & 1 \end{bmatrix} * \begin{vmatrix} Pose_x^k \\ Pose_y^k \\ Pose_z^k \end{vmatrix}$$

where $Zp_x^k$, $Zp_y^k$, $Zp_z^k$ are respectively position data in the x direction, the y direction and the z direction that are generated by optimization according to the extended Kalman filtering iteration;

k denotes a timing; and $Pose_x^k$, $Pose_y^k$, and $Pose_z^k$ are respectively position movement data in the directions of the three axes x, y, and z at the kth timing in the fused data $Pose_{OEM}$.

It should be noted that a specific embodiment of the multi-sensor handle controller hybrid tracking device of the present disclosure is substantially the same as that of the multi-sensor handle controller hybrid tracking method described above, and will not be repeated herein.

According to the present disclosure, through the constructed hybrid tracking system, the optical tracking data, the electromagnetic tracking data, and the inertial navigation data are all taken into consideration, so that the influence of environmental interference factors on the hybrid tracking system is reduced, and the tracking stability of the handle controller is improved.

The foregoing is only specific embodiments of the present disclosure, and under the foregoing teachings of the present disclosure, other modifications and variations can be made by those skilled in the art on the basis of the above embodiments. It should be understood by those skilled in the art that the foregoing specific description is only for the purpose of better explaining the present disclosure, and that the protection scope of the present disclosure is subject to the protection scope of the claims.

What is claimed is:

1. A multi-sensor handle controller hybrid tracking method, comprising:
   acquiring tracking data of a handle controller, the tracking data comprising optical tracking data, electromagnetic tracking data, and inertial navigation data;
   constructing a state transition model and an observation model of an extended Kalman filtering iteration strategy according to the tracking data, and performing an extended Kalman filtering fusion on the optical tracking data, the electromagnetic tracking data, and the inertial navigation data, wherein the constructing a state transition model and an observation model of an extended Kalman filtering iteration strategy according to the tracking data further comprises:
   acquiring 6DoF data and velocity information of an optical pattern mark point on the handle controller relative to a first camera on a head mounted display in real time according to the optical tracking data,
   converting 6DoF data with respect to other cameras into 6DoF data under a coordinate system with the first camera as an origin, by using calibration parameters among the cameras, which is denoted as $Pose_{optic}$, converting electromagnetic 6DoF data of the handle controller into 6DoF data under the coordinate system with the first camera as the origin through calibration parameter of an electromagnetic signal receiver internally provided in the head mounted display and the first camera, which is denoted as $Pose_{EM}$, fusing the data $Pose_{optic}$ and the data $Pose_{EM}$ into new pose data, which is denoted as $Pose_{OEM}$, and constructing the state transition model and the observation model of the extended Kalman filtering iteration strategy by using the new pose data; and determining position and orientation information of the handle controller in a space according to the extended Kalman filtering iteration strategy.

2. The multi-sensor handle controller hybrid tracking method according to claim 1, wherein, the fusing the data $Pose_{optic}$ and the data $Pose_{EM}$ into the new pose data, which is denoted as $Pose_{OEM}$ comprises:

respectively determining whether an angle difference between the data $Pose_{optic}$ and the data $Pose_{EM}$ on x axis, y axis, and z axis is less than a first set threshold, and whether a displacement difference therebetween is less than a second set threshold;

if the angle difference is less than the first set threshold and the displacement difference is less than the second set threshold, respectively taking an average of the data $Pose_{optic}$ and the data $Pose_{EM}$ in the x-axis direction, the y-axis direction, and the z-axis direction as the data $Pose_{OEM}$; and if the angle difference is not less than the first set threshold and/or the displacement difference is not less than the second set threshold, respectively performing weighted average on the data $Pose_{optic}$ and the data $Pose_{EM}$ in the x-axis direction, the y-axis direction, and the z-axis direction to obtain the data $Pose_{OEM}$.

3. The multi-sensor handle controller hybrid tracking method according to claim 1, wherein, the state transition model of the extended Kalman filtering iteration strategy is as follows:

$$\begin{vmatrix} p_x^k \\ v_x^k \\ p_y^k \\ v_y^k \\ p_z^k \\ v_z^k \end{vmatrix} = \begin{bmatrix} 1 & \Delta T & 0 & 0 & 0 & 0 \\ 0 & 1 & 0 & 0 & 0 & 0 \\ 0 & 0 & 1 & \Delta T & 0 & 0 \\ 0 & 0 & 0 & 1 & 0 & 0 \\ 0 & 0 & 0 & 0 & 1 & \Delta T \\ 0 & 0 & 0 & 0 & 0 & 1 \end{bmatrix} *$$

$$\begin{vmatrix} p_x^{k-1} \\ v_x^{k-1} \\ p_y^{k-1} \\ v_y^{k-1} \\ p_z^{k-1} \\ v_z^{k-1} \end{vmatrix} + \begin{bmatrix} 0.5*\Delta T^2 & 0 & 0 \\ \Delta T & 0 & 0 \\ 0 & 0.5*\Delta T^2 & 0 \\ 0 & \Delta T & 0 \\ 0 & 0 & 0.5*\Delta T^2 \\ 0 & 0 & \Delta T \end{bmatrix} * \begin{vmatrix} Acc_x^k \\ Acc_y^k \\ Acc_z^k \end{vmatrix}$$

where $p_x^k$ and $p_x^{k-1}$ are respectively displacement components in the x-axis direction after optimization iteration at a kth timing and a (k−1)th timing, and $p_y^k$ and $p_y^{k-1}$ are respectively displacement components in y-axis direction after the optimization iteration at the kth timing and the (k−1)th timing, and $p_z^k$ and $p_z^{k-1}$ are respectively displacement components in z-axis direction after the optimization iteration at the kth timing and the (k−1)th timing;

$v_x^k$ and $v_x^{k-1}$ are respectively velocity displacement components in the x-axis direction in the optical tracking data at the kth timing and at the (k−1)th timing, $v_y^k$ and $v_y^{k-1}$ are respectively velocity displacement components in the y-axis direction in the optical tracking data at the kth timing and at the (k−1)th timing, and $v_z^k$ and $v_z^{k-1}$ are respectively velocity displacement components in the z-axis direction in the optical tracking data at the kth timing and at the (k−1)th timing;

$Acc_x^k$, $Acc_y^k$, and $Acc_z^k$ respectively denote motion data of a gravitational acceleration sensor in the x axis, the y axis and the z axis after a gravity direction is removed at the kth timing; and $\Delta T$ denotes a time difference between the kth timing and the (k−1)th timing.

4. The multi-sensor handle controller hybrid tracking method according to claim 3, wherein, the observation model of the extended Kalman filtering iteration strategy is as follows:

$$\begin{vmatrix} Zp_x^k \\ Zp_y^k \\ Zp_z^k \end{vmatrix} = \begin{bmatrix} 1 & 0 & 0 \\ 0 & 1 & 0 \\ 0 & 0 & 1 \end{bmatrix} * \begin{vmatrix} Pose_x^k \\ Pose_y^k \\ Pose_z^k \end{vmatrix}$$

where $Zp_x^k$, $Zp_y^k$, and $Zp_z^k$ are respectively position data in the x direction, the y direction, and the z direction that are generated by optimization according to the extended Kalman filtering iteration;

k denotes a timing; and $Pose_x^k$, $Pose_y^k$, and $Pose_z^k$ are respectively position movement data in the directions of the three axes x, y, and z at the kth timing in the fused data.

5. The multi-sensor handle controller hybrid tracking method according to claim 1, wherein, the method further comprises: setting a process noise covariance matrix as follows:

$$PNoiseCov = \begin{bmatrix} p\_error & 0 & 0 & 0 & 0 & 0 \\ 0 & v\_error & 0 & 0 & 0 & 0 \\ 0 & 0 & p\_error & 0 & 0 & 0 \\ 0 & 0 & 0 & v\_error & 0 & 0 \\ 0 & 0 & 0 & 0 & p\_error & 0 \\ 0 & 0 & 0 & 0 & 0 & v\_error \end{bmatrix}$$

where PNoiseCov denotes the process noise covariance matrix, p_error denotes a displacement noise error, and v_error denotes a velocity noise error.

6. The multi-sensor handle controller hybrid tracking method according to claim 1, wherein, the method further comprises: setting a measurement noise covariance matrix as follows:

$$MNoiseCov = \begin{bmatrix} M\_error & 0 & 0 \\ 0 & M\_error & 0 \\ 0 & 0 & M\_error \end{bmatrix}$$

where MNoiseCov denotes the measurement noise covariance matrix, and

M_error denotes a measurement noise error.

7. The multi-sensor handle controller hybrid tracking method according to claim 1, wherein, the acquiring the optical tracking data of the handle controller comprises:
  capturing motion of the handle controller in the space in real time, and obtaining a handle image;
  performing feature detection on the handle image, and acquiring a position coordinate of the optical pattern mark point on the handle controller on the handle image; and
  solving, by a PNP algorithm, position and orientation data of the optical pattern mark point relative to a camera, as the optical tracking data of the handle controller.

8. The multi-sensor handle controller hybrid tracking method according to claim 1, wherein, the acquiring the electromagnetic tracking data of the handle controller comprises:
  emitting an electromagnetic signal by using an electromagnetic signal generator internally provided in the handle controller;
  receiving the electromagnetic signal through an electromagnetic signal receiver internally provided in a head mounted display; and
  acquiring, through an electromagnetic positioning six-degree-of-freedom solution model, position and orientation data of the electromagnetic signal generator relative to the electromagnetic signal receiver, as the electromagnetic tracking data of the handle controller.

9. A multi-sensor handle controller hybrid tracking device, wherein, a surface of a handle controller is provided with an optical pattern mark point, and the device comprises:
  a plurality of cameras provided on a head mounted display and configured to track and shoot the optical pattern mark point;
  an optical sensor configured to acquire optical tracking data of the optical pattern mark point;
  an electromagnetic sensor configured to acquire electromagnetic tracking data of the handle controller;
  an inertial navigation sensor configured to acquire inertial navigation data of the handle controller;
  the head mounted display internally provided with a wireless transmission module and configured to receive the optical tracking data, the electromagnetic tracking data, and the inertial navigation data;
  a model construction module configured to construct a state transition model and an observation model of an extended Kalman filtering iteration strategy and perform an extended Kalman filtering fusion on the optical tracking data, the electromagnetic tracking data, and the inertial navigation data, wherein constructing a state transition model and an observation model of an extended Kalman filtering iteration strategy according to the tracking data further comprises:
    acquiring 6DoF data and velocity information of an optical pattern mark point on the handle controller relative to a first camera on a head mounted display in real time according to the optical tracking data,
    converting 6DoF data with respect to other cameras into 6DoF data under a coordinate system with the first camera as an origin, by using calibration parameters among the cameras, which is denoted as $Pose_{optic}$;
    converting electromagnetic 6DoF data of the handle controller into 6DoF data under the coordinate system with the first camera as the origin through calibration parameter of an electromagnetic signal receiver internally provided in the head mounted display and the first camera, which is denoted as $Pose_{EM}$;
    fusing the data and the data $Pose_{optic}$ and the data $Pose_{EM}$ into the new pose data, which is denoted as $Pose_{OEM}$; and
  constructing the state transition model and the observation model of the extended Kalman filtering iteration strategy by using the new pose data; and
  a tracking module configured to determine position and orientation information of the handle controller in a space according to the extended Kalman filtering iteration strategy.

* * * * *